US005802526A

United States Patent [19]
Fawcett et al.

[11] Patent Number: 5,802,526
[45] Date of Patent: Sep. 1, 1998

[54] SYSTEM AND METHOD FOR GRAPHICALLY DISPLAYING AND NAVIGATING THROUGH AN INTERACTIVE VOICE RESPONSE MENU

[75] Inventors: Philip E. Fawcett, Duvall; Christopher Blomfield-Brown, Seattle; Clifford P. Strom, Maple Valley, all of Wash.

[73] Assignee: Microsoft Corporation, Redmond, Wash.

[21] Appl. No.: 634,577

[22] Filed: Apr. 18, 1996

Related U.S. Application Data

[63] Continuation-in-part of Ser. No. 558,322, Nov. 15, 1995, abandoned.
[51] Int. Cl.[6] .................................................. G06F 17/30
[52] U.S. Cl. .......................... 707/104; 707/10; 379/67; 379/88; 348/14
[58] Field of Search ................................ 395/610, 615; 379/67, 88; 348/14; 707/10, 104

[56] References Cited

U.S. PATENT DOCUMENTS

| | | |
|---|---|---|
| 4,942,616 | 7/1990 | Linstroth et al. . |
| 5,365,577 | 11/1994 | Davis et al. . |
| 5,367,667 | 11/1994 | Wahlquist et al. . |
| 5,388,198 | 2/1995 | Layman et al. . |
| 5,493,608 | 2/1996 | O'Sullivan . |
| 5,559,945 | 9/1996 | Beaudet et al. . |
| 5,563,805 | 10/1996 | Arbuckle et al. . |
| 5,573,506 | 11/1996 | Vasco .................. 604/65 |
| 5,592,538 | 1/1997 | Kosowsky et al. . |
| 5,615,257 | 3/1997 | Pezzulo et al. ........... 379/396 |

OTHER PUBLICATIONS

Athimon et al., "Operational and Experimental French Telecommunication Services Using CNET Speech Recognition and Text-to-Speech Synthesis", Proceedings. Second IEEE Workshop on Interactive Voice Technology For Telecommunications Applications, 26–27 Sep. 1994.

Damhuis et al., ("A Multimodal Consumer Information Server With IVR Menu",Proceedings. Second IEEE Workshop on Interactive Voice Technology for Telecommunications Applications, 26–27 Sep. 1994, Kyoto, Japan pp. 73–76.

Nissen, "Teleworking and the Virtual Organization", Computing and Control Engineering Journal, vol. 7, No. 1, Feb. 1996, pp. 11–15.

Nixon, "Design Considerations For Computer–Telephony Application Programming Interface and Related Component", IEEE Communications Magazine, vol. 34, No. 4, Apr. 1996, pp. 43–47.

IBM Technical Disclosure Bulletin, vol. 33, No. 11, Apr. 1991, pp. 368–371.

Schmandt, C. et al., "Augmenting a Window System with Speech Input," Computer, Aug. 1990, vol. 2, No. 8.

*Primary Examiner*—Paul R. Lintz
*Attorney, Agent, or Firm*—Klarquist Sparkman Campbell Leigh & Whintson

[57] ABSTRACT

Interactive voice response systems (IVRS) are used as interfaces at a wide variety of support and information retrieval centers. A caller who contacts in IVRS-equipped support center can choose to have the voice information contained in the IVRS menus displayed graphically on the caller's communications terminal. The graphical display allows a caller to navigate up and down in the IVRS menus, skipping intermediate steps that would be required making responses to voice queries. In one embodiment the Hyper Text Markup Language (HTML) is used to produce the graphical display. The HTML data also contains a predefined protocol used to display IVRS menus. The graphical display of IVRS menus saves callers time, and displays IVRS information more quickly and thoroughly than could be done with voice. Graphical display of IVRS menus also saves support costs since a caller may find desired information without interaction with support center personal.

58 Claims, 8 Drawing Sheets

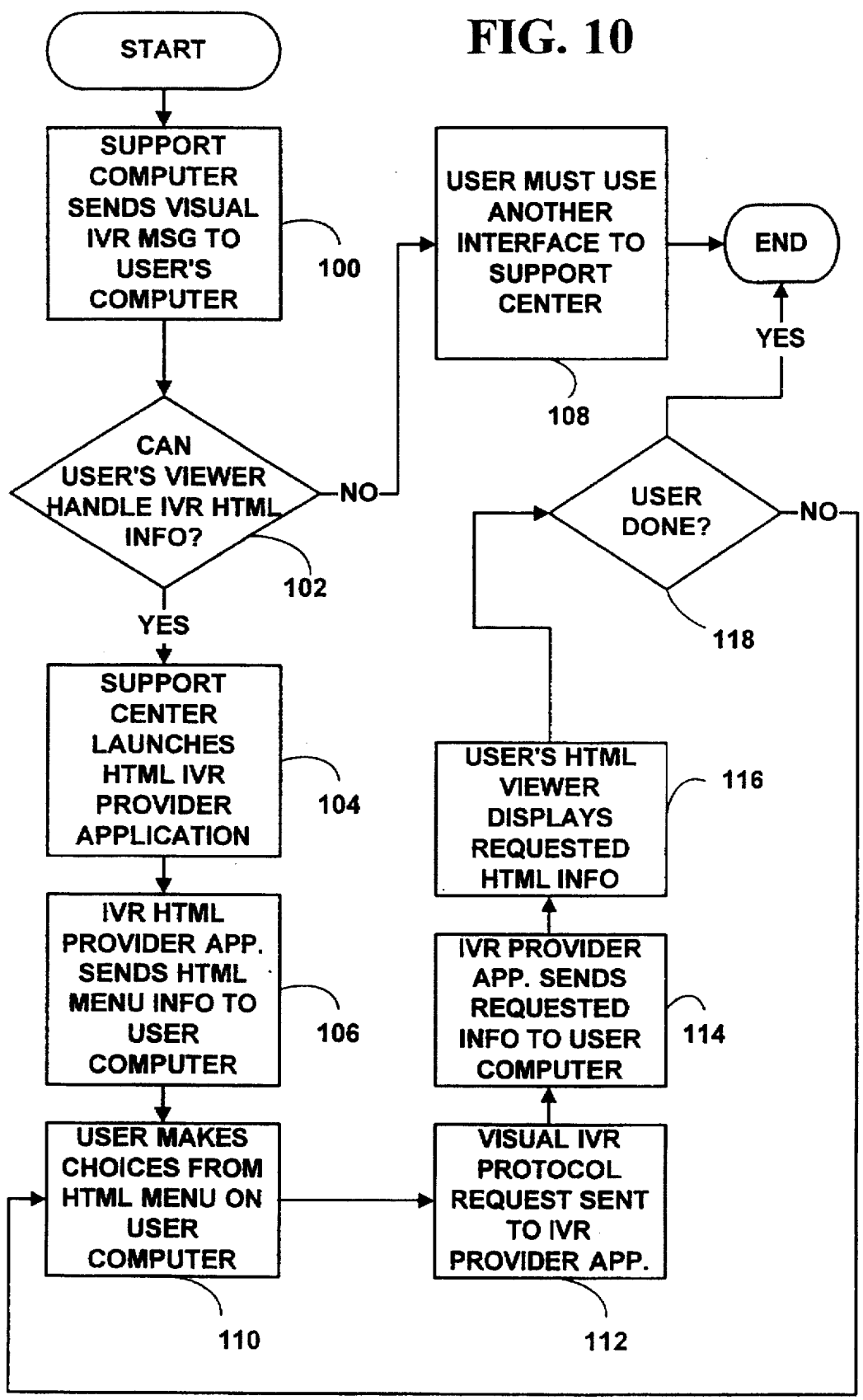

SYSTEM AND METHOD FOR GRAPHICALLY DISPLAYING AND NAVIGATING THROUGH AN INTERACTIVE VOICE RESPONSE MENU

RELATED APPLICATION DATA

This application is a continuation-in-part of application Ser. No. 08/558,322, abandoned, entitled METHOD AND SYSTEM FOR GRAPHICALLY DISPLAYING AND NAVIGATING THROUGH AN INTERACTIVE VOICE RESPONSE MENU, filed Nov. 15, 1995.

FIELD OF INVENTION

The present invention relates to the graphical and textual display of interactive voice response information. More specifically, it relates to a method of graphically displaying and navigating through an interactive voice response menu of queries.

BACKGROUND AND SUMMARY OF THE INVENTION

Interactive voice response systems (IVRS) are currently used in abundance as interfaces at a wide variety of support centers, call centers and other information retrieval centers. When a support center with an IVRS is contacted by a caller, the caller is typically first presented with voice information from an interactive voice response unit (IVRU). The interactive voice response unit poses voice queries to the caller. The caller inputs responses (e.g., with a touch tone telephone and DTMF tones) to the voice queries, and then is presented additional voice queries based on the responses. The caller responses to the voice queries are typically used to route the caller to a desired destination, dispense information for the caller, and/or collect information from the caller.

The interactive voice response unit typically presents a caller with voice queries based on some hierarchical scheme (e.g., a decision tree). General voice queries are presented first, and then, based on caller responses, more specific queries are presented to help narrow and/or focus the caller's requests. For example, if the interactive voice response unit uses a decision tree, a caller would be presented first with queries from the "root" (i.e., the top or most general level) of the decision tree. Then based on caller responses, the caller is presented with more and more specific voice queries (i.e., intermediate level queries). Finally, the caller would reach the lowest level in the IVRU decision tree. At the lowest level in the IVRU decision tree, the "leaf" level, the caller is presented with the most specific voice information available. If the specific voice information at the lowest or "leaf" level is not helpful to the caller, the caller may be placed in a voice queue to speak with the next available caller assistance agent.

As an example, consider an IVRS at a support center called by users having problems with a computer software product. When a user calls, he or she is co nnected to an IVRU. If the interactive voice response unit is set up as a decision tree, the interactive voice response at the root level might be, "Press '1' for network problems, Press '2' for operating system problems, Press '3' for printer problems, Press '4' for spreadsheet problems," etc. If the user was having printer problems, after pressing '3' at the root level, the interactive voice response unit would respond with a second level (intermediate level) of query choices such as "Press '1' if your printer won't print at all, Press '2' if your printer is printing unrecognizable characters, Press '3' if your printer is not printing all the information on one page," etc. This process would be repeated until the user reaches a leaf level of the decision tree. At the leaf level, a user is given additional information that may solve the problem (e.g., your printer driver seems to be out-of-date), or is told to stay on the line to receive help from a support engineer. Which leaf node a user reaches determines which support engineer the user will speak with. The user responses to the voice queries are also used to make a preliminary diagnosis of the user problem.

Interactive voice response systems are also used by a wide variety of other types of call centers to route calls, provide audio information, and collect information from callers. For example, VoiceMail is an enhanced version of an interactive voice response system. For example, an IVRS may be used by a mail order company to list current product information, and then allow a caller to order a product; by a theater to list upcoming or current events, and then allow a caller to order tickets to an event; by a bank to allow a caller to obtain balance information, make an electronic payment, etc.

Consider a theater which uses an IVRS to provide information on upcoming or current events. When a caller contacts the theater, IVRU typically uses some hierarchical scheme to present the caller with an audio menu for the categories of events taking place (e.g., movies, sporting events, plays, etc.). The caller then inputs responses to navigate through the hierarchical scheme to hear audio information on a particular event the caller may be interested in attending. At the lowest, or leaf level, the caller may be asked if they wish to order tickets for an event. The caller may be asked to hold to speak with a "live" ticket agent. In addition, the same IVRU may also be used to collect payment information directly from the caller without the help of a live ticket agent, keeping the process fully automated.

There are several problems associated with using an interactive voice unit to present information to a caller. For example, a caller may have to listen to all of the general voice queries before making even a first selection. This is a time consuming process, and the caller may have to repeat the general level voice query messages several times before a choice is made. At levels below the top level (intermediate levels), the caller is faced with a number of decisions and may not know which choice is appropriate based on the brief voice menu description. If the caller makes several choices based on the voice queries and ends up at the wrong place, then the caller must "unwind" the choices, typically by starting over at some level (e.g., the top level), and then start again, by making new choices. This wastes a considerable amount of the caller's time and leads to caller dissatisfaction.

Interactive voice response units are also typically set up to contain very general information to serve a large number of potential callers. Many times the voice queries presented are not specific enough to allow a caller to obtain the information desired. If the IVRU menu information is too general, the caller will waste a significant amount of time navigating in the IVRU menu, and still not find the information the caller was trying to obtain.

In accordance with the illustrated embodiment of the present invention some of the problems associated with use of an interactive voice response unit to present and collect information at a support center are solved. In one embodiment of the present invention, a caller contacts an IVRU-equipped support center via a voice/data connection (e.g., with an Alternating Voice and Data (AVD) modem, a Simultaneous Voice and Data Modem (SVD), an ISDN device, a network voice device such as Internet Phone, etc.) As one of the first voice queries presented in the interactive voice response menu, a caller is presented with a voice option to create a graphical display of the interactive voice response queries on the caller computer. In another embodiment of the present invention, if the caller contacts an IVRU-equipped call center with a voice/data connection (e.g., an ISDN line) then the graphical display is displayed automatically. However, the user may also be prompted before automatically presenting the graphical display. If this option is chosen by the caller, the caller is presented with a graphical display of the information contained in the interactive voice response menu. The caller responses to the graphical IVR menu items can thereinafter be made from the caller computer.

In another embodiment of the present invention, a caller contacts an IVRU-equipped support center via a data-only connection (e.g., using a standard modem, a network or Internet connection, a wireless connection, etc.). The caller is automatically presented with a hierarchical display of the menu information contained in the IVRU menu without any voice messages. The caller responses to choices in the IVR menu items are thereinafter made from the caller computer. (In some respects, the term IVRU is somewhat misleading since, in some embodiments of the present invention, there is no "voice." However, this term is nonetheless used hereafter as a convenient monicker.)

In the preferred embodiment of the present invention, the graphical display presented by the interactive voice response information uses a hierarchical paradigm which is similar to a decision tree. However, unlike most interactive voice response decision trees, this hierarchical scheme is based on data collected from previous callers and is continually and incrementally updated with new information. Further, the queries presented to a user are determined using a probabilistic scheme which directs the caller to the information that a caller is most likely to want or need based on the system's experience with prior callers.

The graphical display allows a caller to navigate up and down in the hierarchical paradigm scheme quickly and easily with inputs from the caller computer. The caller can also "zoom in" and "zoom out" on part of the hierarchical scheme, skipping intermediate steps that would be required making responses to voice queries. If the caller becomes confused as to which query to choose next, there is also a decision advisor available with information to help the caller make the proper choice. The caller may also have the option at any time to switch back to a voice mode to listen to the voice queries (i.e., if the caller contacted the support center via a voice/data connection).

In one embodiment of the invention, the graphical display is produced using Hyper Text Markup Language (HTML). HTML is one standard for viewing information over the Internet. However, using HTML to create the graphical display of IVRU menus has numerous advantages. A support center can easily and inexpensively construct a graphical menu system using a standard, well accepted, well recognized language. The HTML IVRU menus can then be viewed using a modified or extended HTML viewer. Callers are presented with a familiar, comfortable interface to quickly navigate through the IVRU menu information. HTML can easily be sent over a wide variety of transports, and convey huge amounts of information using HTML links (i.e., links to other information which could be stored on computer systems remote to a support center), that could not be accomplished with a voice IVRU. In addition, HMTL has the capability of sending embedded audio and video information which could provide a "multi-media" menu of IVRU information, and can also provide multi-lingual menus.

Graphical display of the interactive voice response decision information can save the caller a substantial amount of time. Since the voice menu choices are graphically displayed, the caller can step immediately to any level in the hierarchical scheme without having to listen to a number of intermediate voice queries, or can visit intermediate graphically displayed information. If the user makes an incorrect choice, the user can easily undo the incorrect choice by choosing a new level in the hierarchical scheme, without having to visit intermediate levels. Thus, by using a graphical display of the interactive voice menu, desired information can be displayed more quickly and thoroughly than it could be by using other methods such as voice information from an IVRU, or voice interaction with caller assistance agent.

The graphical display of the IVRS may also save the support center, call center, information retrieval center, etc., employing the IVRS significant support costs. The graphical queries are kept up to date based on caller inputs. As a result, desirably callers will typically find the desired information, and not want, or need, to talk with caller assistance agents.

The foregoing and other features and advantages of the illustrated embodiment of the present invention will be more readily apparent from the following detailed description, which proceeds with reference to the accompanying drawings.

BRIEF DESCRIPTION OF THE DRAWINGS

FIG. 10 is a flow diagram showing a user can display interactive voice response menus graphically with a HTML viewer.

DETAILED DESCRIPTION OF AN ILLUSTRATED EMBODIMENT

Figure 1:
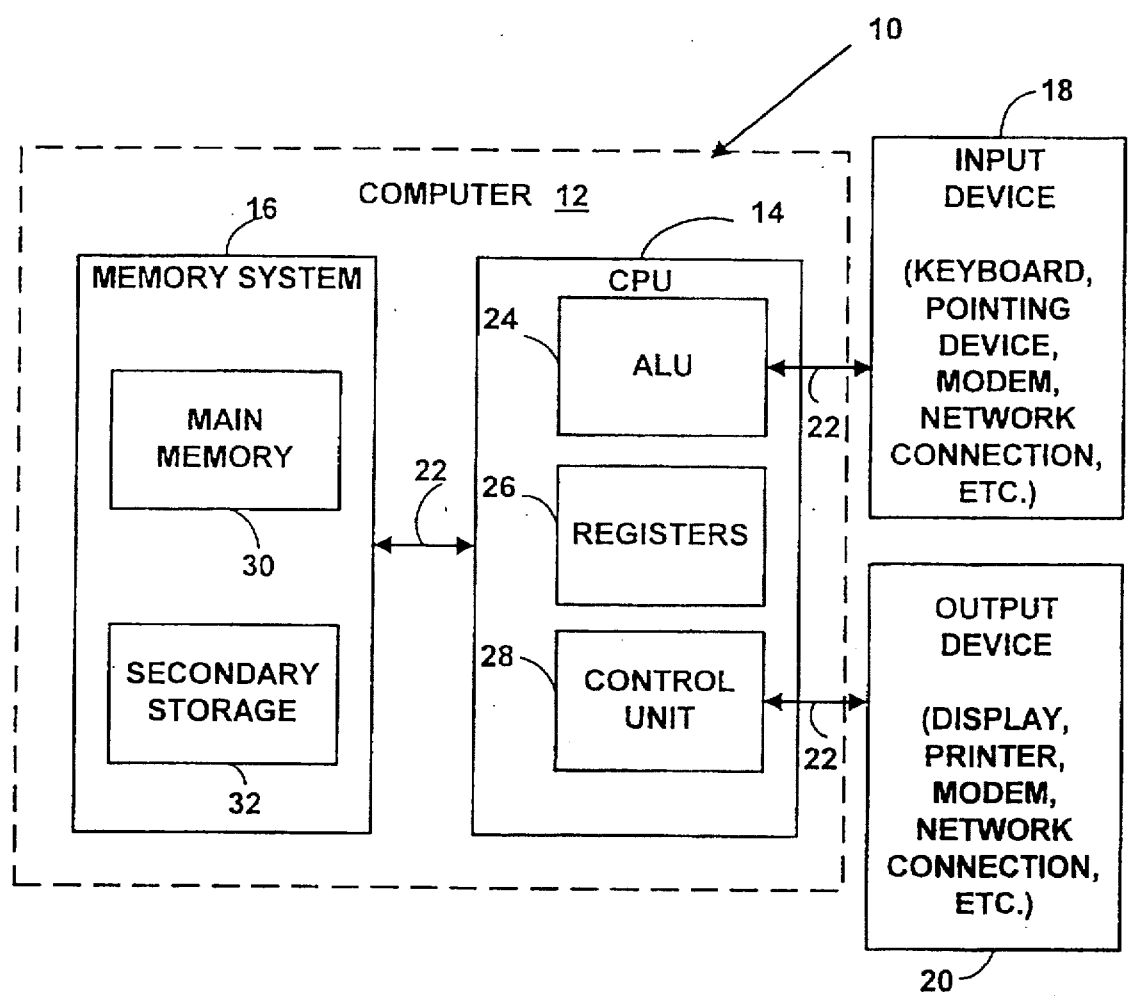
FIG. 1 is a block diagram of a computer system used to implement an illustrated embodiment of the present invention.

Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10.

Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software which controls the computer system's operation and the allocation of resources. The application program is a set of software that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

A communications terminal, that comprises at least a CPU 14, a memory system 16, and an input/output device (18,20) is used for the preferred embodiment of the present invention. For example, the communications terminal may be a smart modem (i.e., a modem with a CPU and memory system), smart network card, a computer workstation with a network connector or a modem, a personal computer with a network connector or a modem, etc. However, the communications terminal is not limited to this list, and can comprise a variety and/or combination of alternative components.

Figure 2:
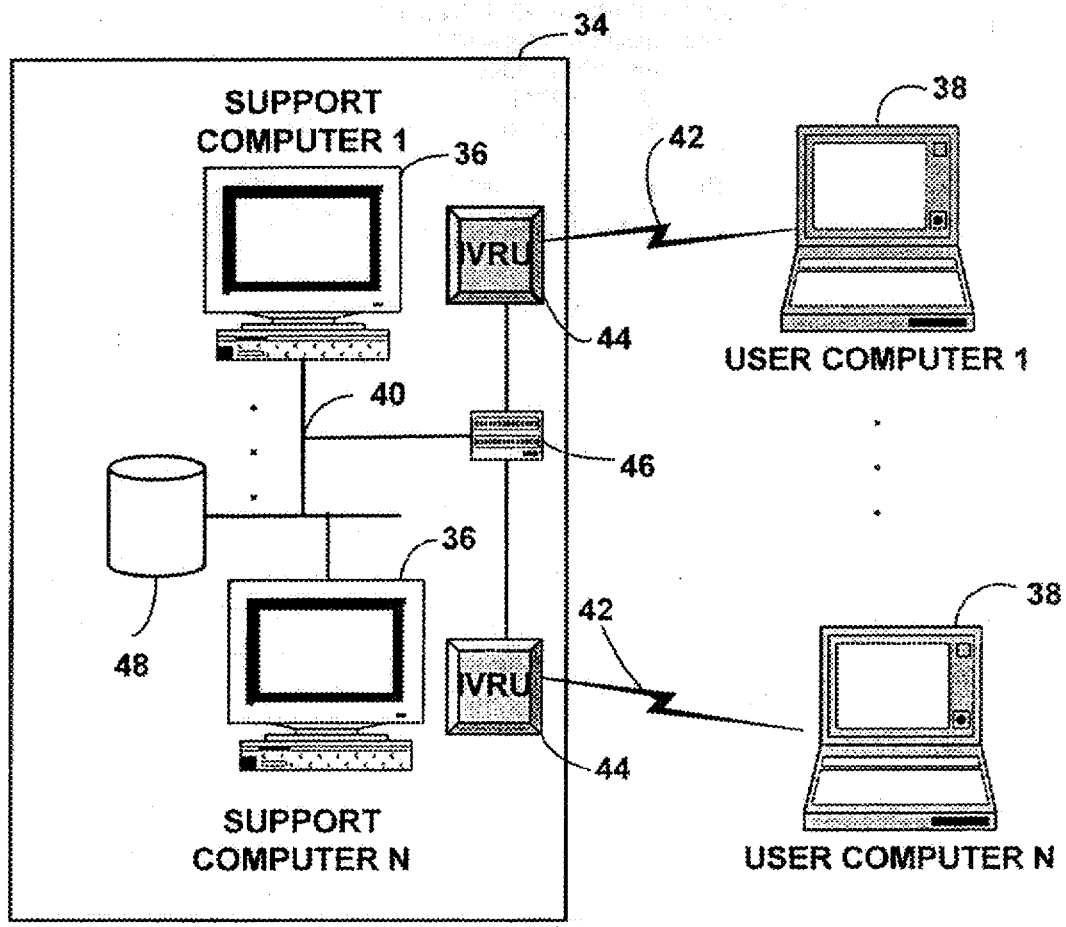
FIG. 2 is a block diagram showing a support center and user computers.

As is shown in FIG. 2, the illustrated embodiment of the invention consists of a support center 34 with one or more support computer systems 36 (e.g., the computer system that was described in FIG. 1) and a plurality of user computer systems 38. If a plurality of support computers are used, then the support computers may be connected by a local area network (LAN) 40 or any other similar connection technology. However, it is also possible for a support center to have other configurations. For example, a smaller number of larger computers (i.e., a few mainframe, mini, etc. computers) with a number of internal programs or processes running on the larger computers capable of establishing communications links to the user computers. The support center provides a plurality of communications links 42, such as telecommunications connections, (e.g., modem connections, ISDN connections, ATM connections, frame relay connections, etc.), network connections, (e.g., Internet, etc.), satellite connections (e.g., Digital Satellite Services, etc.), wireless connections, two way paging connections, etc. to allow one or more user computers to simultaneously connect to the support computer(s). The communications links are each connected to one or more interactive voice response units (IVRU) 44 that can be accessed by user computers.

The individual IVRUs 44 are connected to an IVRU server 46. The IVRU server 46 manages the IVRUs and also permits a user to bypass the IVRU menu and directly access one or more databases 48 maintained at the support center. These databases 48 store entries consisting of informational queries made by previous callers (e.g., information queries for problems previously encountered by other users for the computer software supported by the support center). When a user chooses to bypass the IVRU, the IVRU server 46 permits the user to query the support center databases to find information (e.g., for a problem the user is encountering) that may not be mentioned in the IVRU menu presented to users.

In addition, a subset of the database entries, consisting of information queries requested by other users (e.g., for problems encountered) are used to continually and incrementally update the menus in the IVRU. The same database entries are also used to create a graphical display of the IVRU audio menus.

The illustrated embodiment of the invention is implemented in the Windows® 95 operating system by Microsoft Corporation of Redmond, Wash. using VoiceView™ data transfer technology by Radish Communications Systems of Boulder, Colo. Under VoiceView™, only voice OR data is transmitted at any one (i.e., VoiceView™ modems are alternating voice and data (AVD) modems). The invention can likewise be practiced with operating systems and other technologies that allow simultaneous voice AND data transfer, such as simultaneous voice and data (SVD) modems, ISDN devices, etc. or with network or other connections. The VoiceView™ data protocol technology has been enhanced to provide functionality not available in the standard VoiceView™ data protocol as will be explained below.

In the preferred embodiment of the present invention, graphical display of IVRU voice information is used by a support center called by users after encountering problems with a computer software product. However, the invention is not limited to computer software product support centers, but can be used by a wide variety of other types of customer assistance and information retrieval centers.

Figure 3:
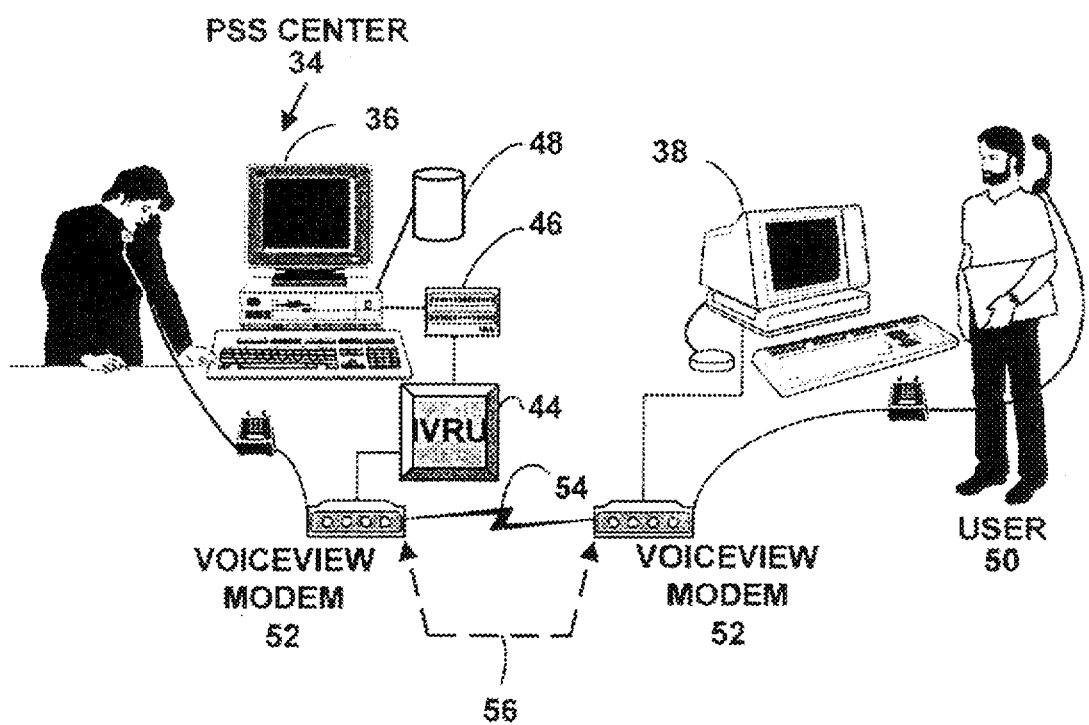
FIG. 3 is a picture diagram showing how a user and a support engineer would interact.

As is shown in FIG. 3, a user 50, using a user computer 38, calls a support center 34 (hereinafter referred to as a product support service (PSS) center) with a VoiceView™ modem 52 (or other appropriate communications device) and needs help with a particular computer software problem. A communications path 54 for data transfer is set up over the same voice line which carries the user's voice signals. The communications path is routed through an interactive voice response unit (IVRU) 44 in the support center. The IVRU is connected to an IVRU server 46. A VoiceView™ modem allows the user to make a voice connection with a support center, and allows the support center to send/receive data to/from the user's computer over the same telephone line as the voice connection.

Figure 4:
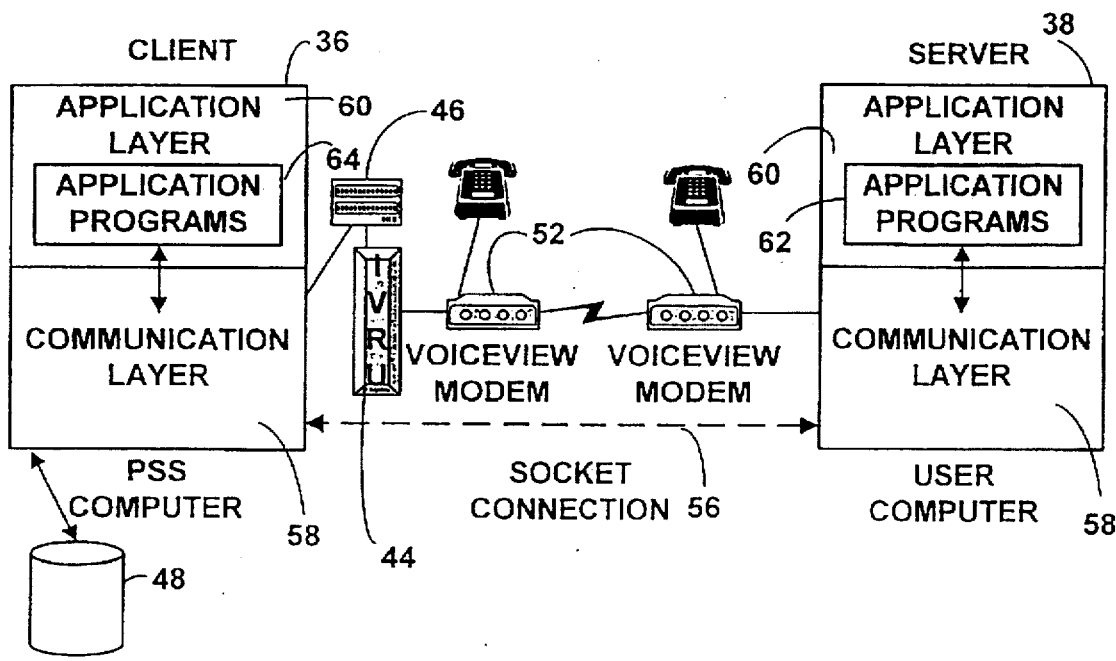
FIG. 4 is a block diagram showing a layered software support messaging architecture used to produce a graphical display.

As is shown in FIG. 4, the PSS system implements a two-layer protocol stack: the communication layer 58 and the application layer 60. The two layer protocol stack provides a common network protocol for passing data and issuing commands between the client 36 and server 38.

The communication layer's 58 primary responsibility is to transfer data between the client 36 (the PSS computer) and the server 38 (the user's computer). The application layer's 60 primary purpose is to utilize the communication layer's network services while maintaining ignorance of the networks underlying protocol and hardware. The PSS's application programs 62 reside in the application layer 60.

The two-layered protocol approach frees the application program 62 from the communication protocol complexity and implementation. The two-layer protocol stack operates over a socket connection 56. As is well known in the art, a socket is a communication object from which messages are sent and received. Sockets are common inter-process communication objects in many operating systems (e.g., BSD UNIX®, Windows® 95, etc.).

Whether the messaging system is based on VoiceView™ sockets, UNIX® sockets, or datagrams, TCP/IP sockets, IPX or other sockets, the protocol details are entirely hidden from the application layer 60. Therefore, the PSS application programs 62 need not be rewritten if the underlying communication protocol is changed. Also, socket management code need not be replicated in each of the application programs 62. Another benefit of this architecture is that any number of client programs (on the PSS computers) can communicate with their corresponding server programs (on the user computers) through this common protocol. Client and server applications do not communicate directly with each other because replacement of the network platform and/or network protocol would make the applications obsolete.

Figure 5:
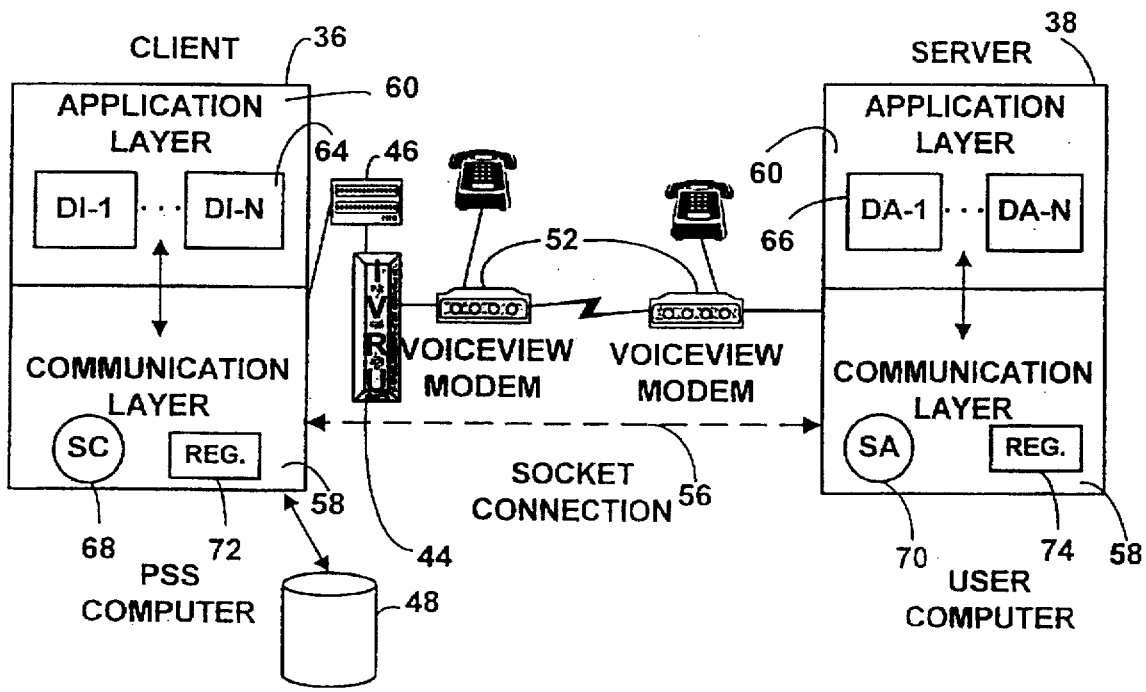
FIG. 5 is a block diagram showing greater detail within the of the software messaging architecture used to produce the graphical display.

The PSS messaging system applications have two components: interpreters (INs) 64 and agents (ANs) 66 as is shown in FIG. 5. The interpreter 64 is client software which initiates commands and interprets their results for the PSS. The agent 66 is server software which executes commands issued by the interpreter and then returns results to the PSS.

The PSS messaging system has both client and server components in the communications layer 58 that are used for message transfer. The support client (SC) 68 is a client messaging process which sends and receives messages on behalf of interpreters 64. The support agent (SA) 70 is a server messaging process which sends and receives messages on behalf of agents 66. Also included in the communications layer 58 of both the client and the server are registries 72 and 74, respectively, used to keep track of which client/server processes are sending/receiving messages. Communication between a particular interpreter and agent occurs via a socket identifier allocated to the pair. Socket setup (create( ), bind( ), listen( )), connection (connect( ), accept( )), and communication (send( ) receive( )) are well known and will be understood by those skilled in the art.

After a socket connection 56 is established, a user is presented with interactive voice response menu queries from the IVRU 44. The interactive voice response system is built using a hierarchical paradigm similar to a decision tree from the information contained in a support center database 48. The hierarchical paradigm is based on data collected from problems previously encountered by users and is continually and incrementally updated as users encounter new or previously unknown problems with computer software. Further, the queries presented to a user are determined using a probabilistic scheme which directs the user to solutions for problems which are most likely to be encountered using a particular set of computer software.

As an example, if a defect has been discovered with printer driver that will cause every user with a particular printer to experience the same problem, it is highly probable that a majority of the calls a support center receives for problems with that printer will relate directly to the defective driver. As a result, the interactive voice response unit presents voice queries that point a user directly to the defective driver problem. Thus, intermediate steps a user would normally go through are skipped. Other potential problems, such as network problems, application problems, etc. are presented to the user in a similar fashion.

In the illustrated embodiment of the present invention, the first voice query presented by the interactive voice response unit to a user is a query allowing a user to graphically display the interactive voice response menu queries. Since the user has established a two-way voice/data connection between the user computer and the PSS computer, (e.g., via a socket connection 56), the PSS computer will launch a Windows® 95 interpreter 64 (FIG. 5) (e.g., called the Voice Menu Graphical Interpreter) to help create a graphical display of the interactive voice response information. The interpreter downloads, registers, and executes the agent, (e.g., called the Voice Menu Graphical Agent), which creates the graphical display on the user computer from the interactive voice response menu information. Those skilled in the art will understand the downloading, registering, and execution of a software application in a client/server environment.

Figure 6A:
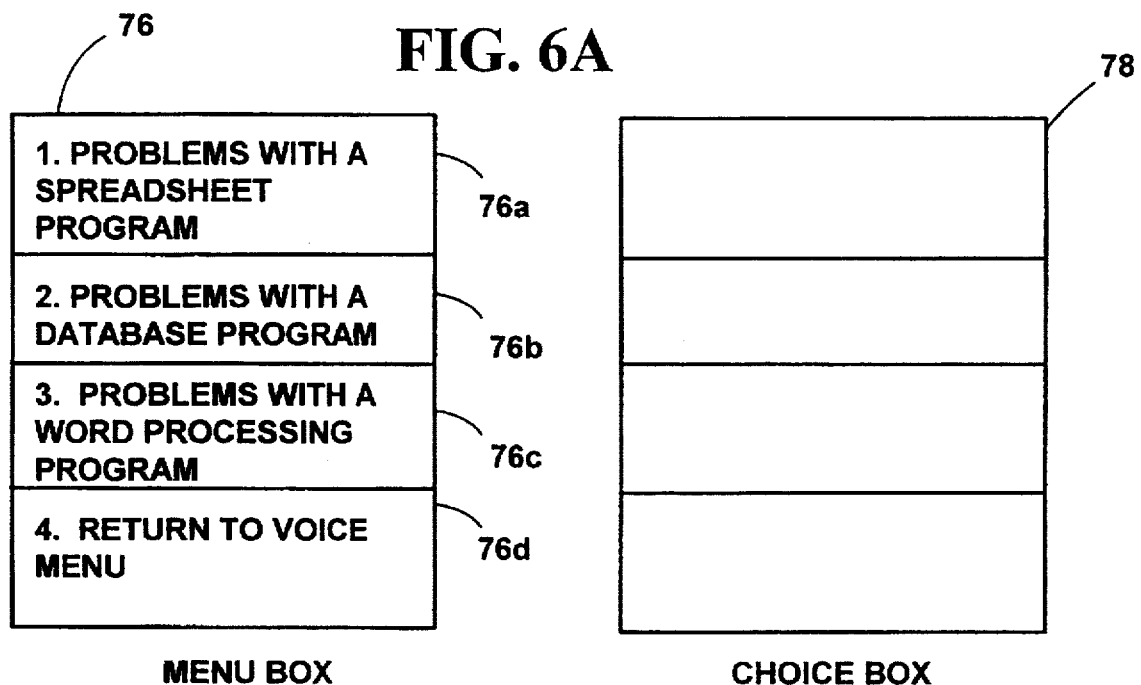
FIGS. 6A–6B are block diagrams showing the menu boxes and the choice boxes of a graphical display of a interactive voice response menu.

When the Voice Menu Graphical Agent is executed, it creates a graphical display of the interactive voice response menu hierarchical paradigm, an example of which is shown in FIG. 6A. However, the interactive voice response menu queries can be displayed with text, graphics, and/or a combination of text and graphics depending on user preference. The IVR menus can also be displayed without the graphical agent/interpreter as will be explained below.

As an example, suppose a user is using a word processing program and has a problem printing a document. FIG. 6A shows a representation of the graphical display that could be presented to a user's computer. The interactive voice response menu queries are presented on the left side of the screen in a menu box 76, and any choices (e.g., with a mouse, keyboard, etc. connected to the user computer) a user makes are presented on the right side of the screen in a choice box 78. Since the user is having problems using a word processing program, option 3 from the menu 76c is chosen from the menu box 76. As a user makes choices, the choices are displayed in the choice box 78. Since the user is at the top or most general level of the text menu in the hierarchical paradigm scheme, and no choices have yet been made, the choice box 78 is currently empty.

Figure 6B:
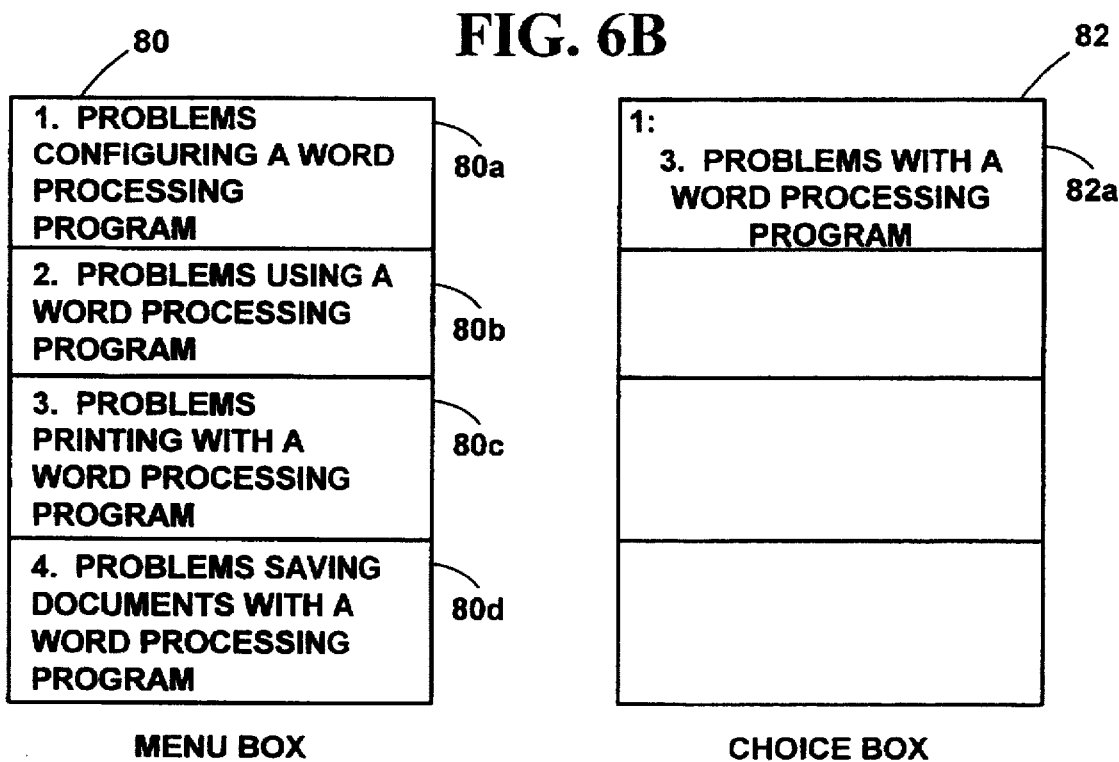

FIG. 6B shows the display after a user has chosen option 3 ("3. problems with a word processing program") 76c from FIG. 6A. A new level of queries is presented in the menu box 80 (80a–80d) on the left side of the screen, and the choice box 82 on right side of the screen displays the user choice 82a. The choice box 82 has only one entry 82a since the user has only made one choice. The number one (1:) in the upper left hand corner of box 82a indicates that this entry was chosen from level one in the interactive voice response menu hierarchical scheme. Query number three ("3. Problems with a word processing program") was the actual choice made at level one, (76c of FIG. 6a) as is shown in box 82a.

This scenario continues with user choices, new queries in the menu box, and new entries in the choice box until a user reaches the lowest possible level based on their choices in the hierarchical scheme. As a user moves "down" in the hierarchical scheme, entries are added to the choice box. As a user moves "up" in the hierarchical scheme, entries are removed from the choice box. As a result, the user always knows what choices have been made, and can immediately "zoom in" or "zoom out" to any level in the hierarchical scheme.

Figure 7:
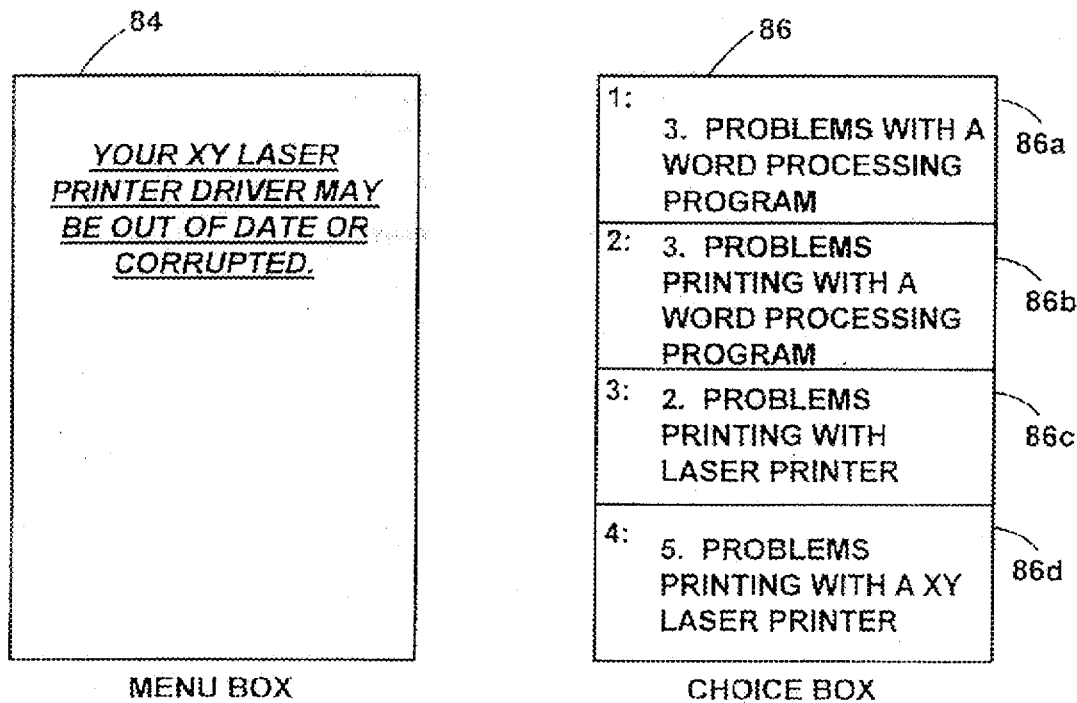
FIG. 7 is a block diagram showing the menu box and the choice box at one of the lowest level in the hierarchical scheme of a graphical display of a interactive voice response menu.

FIG. 7 shows the display after a user has reached one of the lowest levels in the hierarchical scheme. The menu box 84 does not contain any further queries, but now contains information which provides a potential solution to the user problem. (In the actual implementation, the information at the lowest level in the hierarchical scheme may be much more extensive than is shown in the example in box 84.) The choice box 86 is filled with choices (86a–86d) the user has made at each level (e.g., box 86c shows on level three ("3:"), the user chose the second option "2. Problems printing with a laser printer").

If the user wishes to change levels in the hierarchical scheme at any time, all the user needs to do is to choose the appropriate entry in the choice box. For example, if the user has the display shown in FIG. 7, and wishes to reach the general menu (highest level) in the hierarchical scheme, the user would simply choose (e.g., with a mouse or keyboard, etc.) the entry labeled one (i.e., "1":) containing the text "3. problems with a word processing program" 86a in the choice box. The user would then jump back to the display shown in FIG. 6A, skipping all levels in between. The menu box 74 (FIG. 6A) would be re-displayed, and the choice box 76 (FIG. 6A) would be empty again since the user has returned to the highest level in the hierarchical scheme.

Jumping to intermediate levels in the hierarchical scheme produces similar results, with the menu box displaying possible choices and the choice box partially filled with choices the user has made to get to the intermediate levels. The user can skip any or all of the intermediate steps that would require visiting when using the voice mode of an IVRU. For example, if the user made seven choices, the user would be down at least seven levels in the hierarchical paradigm. If the user then wished to return to level three the user could jump immediately back to level three, by selecting "3:" from the choice box and then make new choices from level three. Using the IVRU in voice mode, the user would most likely be required to return to level one, make the same choices as made previously to return to level three, and then make new or additional choices, which would waste a considerable amount of time.

In addition, the user can jump out of the IVRU graphical menu at any time, and with the help of the IVRU server, access the support center data base to obtain additional information not displayed on the IVRU graphical menus to help solve a particular problem.

FIGS. 6A, 6B, and 7 show an example of a textual display of the interactive voice response menu. However, any other display layout that would convey the information from the interactive voice menu hierarchical scheme could also be used.

A graphical/text combination on a graphical display can also be used. For example, the hierarchical display can be represented by a graphical "tree" structure containing many nodes. The user would then choose a "node" in the tree (analogous to choosing an item from the menu box). The tree node would then be expanded to present the "subtree" below the chosen node (analogous to a new menu box). After each user choice, a smaller scale display tree (analogous to the choice box) graphically shows the user path (e.g., in a color different from the rest of the tree) and present location in the tree. The node choosing is repeated until a "leaf" node is reached, where information is presented to potentially solve the user problem as described above (and shown in FIG. 7). Any number of other graphics/text schemes could also be used to display the interactive voice menu hierarchical scheme for the user.

Figure 8:
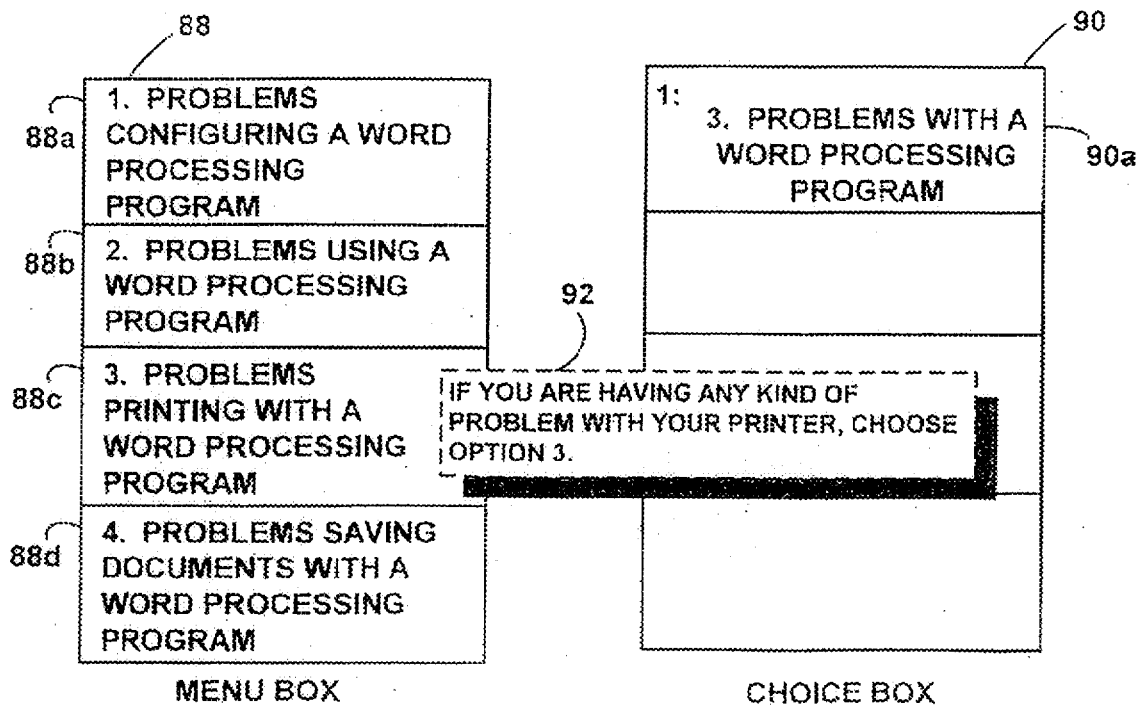
FIG. 8 is a block diagram showing the decision advisor for the display information shown in FIG. 5B.

If a user should be confused about which path in the hierarchical scheme to choose, a decision advisor associated with each level gives a more detailed explanation to aid the user in making a correct decision. The decision advisor is more than a generic help function. The decision advisor knows what choices the user has made. Based on these choices, the decision advisor queries the support center databases and directs the user to make additional choices that, based on previously encountered problems, are most likely to solve the current user's problem. Decision advisor text is shown in FIG. 8.

Suppose a user was having trouble printing a document from a word processing program. If the user had trouble deciding whether to choose option 2 88b, or option 3 88c, (i.e., trouble deciding whether their problem falls within "problems using a word processing program" or "problems printing with a word processing program") the decision advisor is used to help the user make the decision. The decision advisor "knew" the user was having problems with a word processing program 90a. After a query to the PSS database, the decision advisor would direct the user to the proper choice 92.

If the user invokes the decision advisor for option 3 88c, an advisor box 92 is displayed with additional information to aid the user in making a decision based on the user's problem. In the actual implementation, the help information displayed by the decision advisor may be more extensive than is shown in 92.

In the worst case scenario, the user would reach the lowest level in the hierarchical paradigm and not be able to solve their problem. In this case, the IVRU server can take one of a number of actions. The IVRU server may connect the user to another network (e.g., the Internet) to search for more information; the user might be put into a voice queue to talk with the next available support engineer to obtain "live" help for their problem; or the user may be allowed to further query the support center databases.

When a user reaches the lowest level 84 (e.g., as is shown in FIG. 7) and other selective intermediate levels in the hierarchical scheme, the IVRU server may download, register, and execute additional applications. Each level in the hierarchical scheme represents a particular type of problem a user may commonly encounter. The additional applications are downloaded and launched to collect additional information from the user computer and return it to the PSS computer. The additional information collected may be used to further direct graphical information to the user, or be sent to a support engineer who will provide "live" help if the user is placed in a voice queue to talk with the next available support engineer.

As one specific example, using the word processing printer problem example described above, when the user arrives at the lowest level in the hierarchical scheme 84 (FIG. 7), a diagnostic interpreter (e.g., a Printer Control Diagnostic Interpreter) on the PSS computer is launched. The Printer Control Diagnostic Interpreter would then download (i.e., if the Printer Control Diagnostic Agent did not already exist on the user computer) and execute a diagnostic agent (e.g., a Printer Control Diagnostic Agent) on the user's computer. The Printer Control Diagnostic Agent would then run diagnostics on the user's printer, check the printer-related software on the user computer, etc. using other pairs of specific diagnostic agents and diagnostic interpreters.

The diagnostic information collected by the Printer Control Diagnostic Agent on the user computer is then sent back to the Printer Control Diagnostic Interpreter on the PSS computer. The Printer Control Diagnostic Interpreter saves the information for later display and interpretation by a support engineer. A similar sequence takes place for network problems, application problems, etc., using the appropriate interpreter/agent pairs.

In many cases, the user may solve the problem by navigation through the graphical representation of the interactive voice response menu. As a result, the user may terminate the connection before talking to a support engineer. This saves the support center significant support costs. However, if the user cannot solve the problem based on navigation through the graphical interactive voice response menu, or with additional queries to PSS databases, the user is presented with a message that instructs the user to stay on the line to talk with a support engineer. The user is then added to a voice queue.

When a support engineer becomes available, data collected by agent(s) launched during the user's navigation through the hierarchical scheme, if any, is displayed for the support engineer (as was described above for the printer problem example).

The support engineer can quickly examine the data and discuss the results with user. If additional information is required, the support engineer can download and execute additional applications to collect the information from the user computer. As a result, the user's problem may be diagnosed more quickly and thoroughly than it could by using other methods such as an interactive voice response menu or voice interaction with a support engineer.

In another embodiment of the present invention, a user can connect to the support center by making a data connection. If a data connection is made (e.g., with a generic modem, Internet connection, etc.), no voice communications are available. This allows a wide variety of users without a VoiceView™ modem (or other AVD or SVD modem, ISDN device, etc.) to also interact with the support center using a standard (i.e., data-only) modem. In yet another embodiment of the present invention, a user can connect to the supper center by making a data connection with a voice/data connection (e.g., ISDN, etc.).

Figure 9:
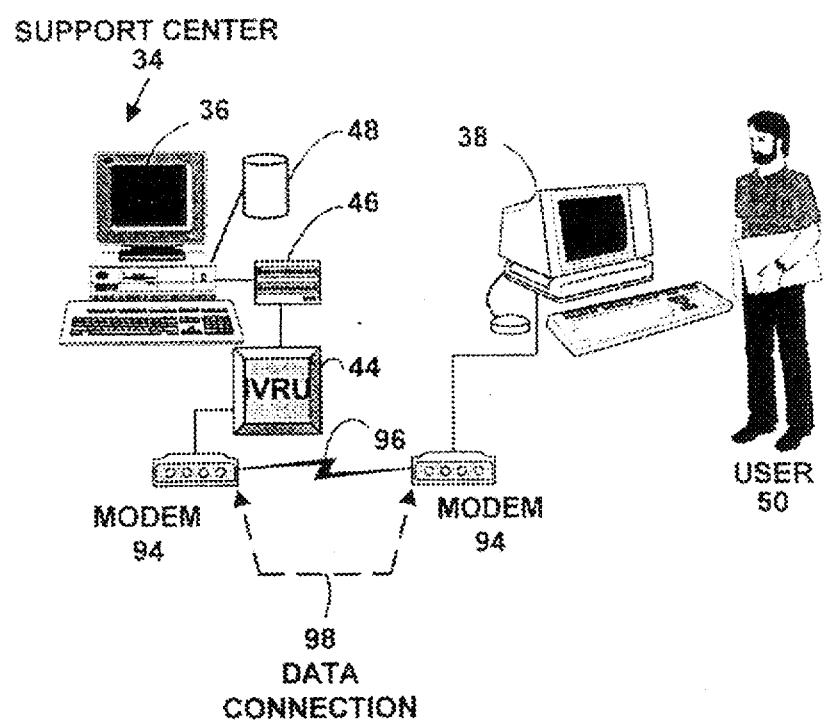
FIG. 9 is a picture diagram showing a user and a support center using an interactive voice response system.

As is shown in FIG. 9, when a user 50, using a computer 38, calls a support center 34 (PSS center) with a standard modem 94 (or other appropriate data communications device) and wants information, a communications path 96 (via a data connection 98) for data transfer is set up over the caller's telephone line. However, no voice traffic is available with this data connection. A standard modem 94 at the support (PSS) center 34 allows the user 50 to make a data connection 98 with the support center, and allows the support center computer 36 to send/receive data to/from a user's computer 38. The communications path is routed through an interactive voice response unit (IVRU) 44 at the support center. The IVRU is connected to an IVRU server 46 which permits access to one or more databases 48 at the support center. As was described above, the IVRU server 46 can be used to bypass the IVRU and permit a user to directly query a database 48 at the support center to obtain information not displayed in the graphical IVRU menu.

In this embodiment, the voice interactive response menu decision tree is automatically displayed on the user's computer 38 in a graphical format as the default option (e.g., with an ISDN data connection). The user navigates through the graphical interactive voice response menu as described above. This embodiment may also include having the PSS computer launch diagnostic applications on the user computer when the user visits selected levels in the hierarchical scheme. However, the ability to launch diagnostic applications on the user computer depends on the specific type of data connection that has been established between the user computer and the PSS computer.

Since the user may not have a voice connection to talk to a support engineer for further assistance, if further assistance is required, the user would have to establish a voice connection or voice/data connection with the support center (or rely on a "chat" mode of data communication). However, even without a voice connection, the user can still receive the diagnostic benefits associated with navigation through the graphical interactive voice response menu described above.

In yet another embodiment of the invention, Hyper Text Markup Language (HTML) is used to create the graphical menus which are displayed on the user computer. HTML is a standard for viewing information over the Internet. However, HTML can be used for non-Internet applications. HTML can be used to create graphical menus for any connections (e.g., voice/data, data satellite, wireless, network, etc.) a caller can make to a support or call center, or a remote information server.

When HTML is used to create a graphical display of IVRU menus, an HTML viewer parses the HTML information and displays text and/or graphics on the display device connected to the user computer.

To use HTML to display IVRU menus, a new protocol called the "Visual HTML IVR protocol" is used. The Visual HTML IVR protocol acts very similar to the existing HTML file transfer protocol.

In a preferred embodiment of the present invention using HTML for graphical display of IVRU menu information, the Visual IVR protocol is implemented by modifying or extending the Microsoft® Internet Explorer™, an HTML viewer, which runs under the Windows® 95 operating system by Microsoft® Corporation of Redmond, Wash.

However, other HTML viewers (e.g., Netscape™, Mosaic™, NetCrusier™, etc.) running under other operating systems could also be modified or extended to accept the HTML Visual IVR protocol.

When HTML is used to display IVR information from an IVRU, HTML Visual protocol information is automatically added to the beginning of all Uniform Resource Locators (URLs)(local and remote) that will obtain HTML files from the remote support center by the support center computer. For example a menu item which contains a local URL in "normal" HTML syntax would have the format:

<A HREF="linkfile.html"></A> where HREF provides an address to another location to jump to, '<A "string" </A>' represents HTML syntax to enclose a HTML file name for a URL (i.e., a link), and 'NAME=' is the name of the HTML file to use for the link. When a user selects this HTML link from the HTML menu items, the HTML viewer looks for the file "linkfile.html", on the local machine.

However, when the HTML Visual Protocol is used to display IVR information, the same HTML local URL syntax becomes:

<A HREF="ivr:linkfile.html"></A>

The string "ivr:" is prepended to all URL links which require HTML IVR files from the remote support center.

Remote URLs are treated in a similar manner. For example, a menu item which contains a remote link in "normal" HTML syntax would have the format:

<A HREF="http://machineaddress/path/linkfile.html"></A>

The HTML viewer will attempt to make a hyper text transfer protocol (http) connection to "machine-address" and obtain "linkfile.html" from "machine-address/path."

However, in another embodiment of the present invention, when the HTML Visual Protocol is used, the same HTML remote URL syntax becomes:

<A HREF="ivr:http://machineaddress/path/linkfile.html"></A>

The string "ivr:" is prepended to all such remote HTML URLs on the support center computer.

In this case (i.e., "ivr:http:"), the remote support computer must then make an hyper text transfer protocol connection to a third remote computer (i.e., remote to both the support center computer and the user computer) to obtain the desired HTML file. The desired HTML file is then transfered from the third remote machine to the remote support center computer, and then from the remote support center computer to the user computer. Only remote URLs which require files from the remote support center computer will have the "ivr:" string prepended. This allows the HTML viewer to continue to make hyper text transfer protocol connections from the user computer to a remote computers (other than the remote support center computer) directly as desired.

A remote URL can also be a Gopher request (e.g., gopher://gopher-machine-address), ftp request (e.g., ftp://machine-address), or other remote linkups which are known in the art. When HTML Visual IVR protocol is used, these remote URL requests would also have the "ivr:" string prepended (e.g., ivr:ftp://machine-address).

The HTML Visual IVR protocol is added to all appropriate HTML URLs by the support center before the IVR information is sent in HTML format to the user computer. To take advantage of the Visual HTML IVR protocol, a user must have a modified HTML viewer. The following pseudocode shows how the HTML viewer can be modified to support the Visual HTML IVR protocol:

```
for (every URL request made by a user)
{
    //examine the URL prefix
    if (the URL prefix contains the string "ivr:") // special
            Visual HTML IVR protocol request
    {
        strip the "ivr:" prefix from the URL;
        send remaining URL to remote support center computer;
        wait for HTML file transfer to complete;
        //check the HTML file pointer returned
        if(the HTML file pointer returned == NULL)
        {
            //problem retrieving the remote HTML file
            cleanup;
            send error sequence;
            return;
        }
        else
        //file was successfully retrieved from remote machine
            display HTML IVR file information;
    }
    else //Normal Local or remote URL Request
        process "Normal" URL request;
}
```

As is shown in the flowchart in FIG. 10, when a user contacts a support center with an IVRS, the support center computer will send a data packet to the user's HTML viewer indicating that it is capable of receiving HTML information using the HTML Visual IVR protocol 100. If the user's HTML viewer is capable of receiving HTML information 102, the support center will launch an IVR provider application 104. The IVR provider application queries the support center database, and provides IVRU menu information as HTML information using the pre-defined HTML Visual IVR protocol 106. If the user's HTML viewer is not capable of sending HTML information, the user cannot use the HTML viewer to display HTML IVR menu information. As a result, the user may re-contact to the support center using another interface 108 (e.g., the agent/interpreter pairs described earlier). If IVRU menu information is sent as graphical/text data (i.e., non-HTML data), there must be an application on the user computer capable of understanding and displaying the graphical/text data stream, and an application capable of sending the graphical/text data stream (e.g., voice graphical menu agent/interpreter pair described above), or some other method of sending two-way graphical text data.

After the IVRU menu information is displayed, a user can make choices on the HTML menus to obtain additional information from the support center 110. When a user choice is made, on a URL using HTML Visual IVR protocol (i.e., has an "IVR:" prefix), a request is then sent from the modified or extended HTML viewer on the user computer to the IVR provider application on the support center computer 112. The IVR provider application finds the desired information, and then sends it back to the user's HTML viewer 114. In the preferred embodiment, the HTML file data is sent as a file by the Windows® 95 File Transfer Engine. However, other file transfer mechanisms could also be used. Once the user's HTML viewer receives the HTML information, it is displayed using standard HTML parsing 116.

If a user chooses a HTML menu item which is an HTML URL link containing the HTML Visual IVR protocol, then steps 110–116 would be repeated to display the HTML link information. The user repeats steps (110–166) until they have obtained the desired information from the support center 118. As was described above, a user can also access information with a URL pointing to information on the local computer, and a remote computer (e.g., "http:" with no "IVR:" prefix) other than the support center computer.

The Visual IVR protocol can be used over a number of data transports to display IVRU menu information. For example, over sockets using a VoiceView™ modem as was described above (and shown in FIG. 5), over a data connection on a standard modem, over an voice/data connection (e.g., AVD, SVD modem, ISDN devices, etc.) over a network connection (e.g., PPP, SLIP, TCP/IP, etc.), etc. The HTML information can also contain embedded audio (e.g., *.WAV files), video (e.g., MPEG encoded video, etc.) and pictures (e.g., JPEG encoded still images, .GIF files, etc.) to further enhance the IVRU menu information. The capabilities of the HTML viewer are used to display this embedded audio, video, and pictorial information.

The HTML Visual IVR protocol information can be added quickly and automatically by the support center computer to HTML data sent to remote computers. This provides a very flexible way to use the HTML format to display the IVR menu information.

An additional benefit of using HTML to graphically display IVRU menu information is that multi-lingual menus can be produced quickly and easily (which is not the case with a graphics/text information stream). This provides great flexibility for users who prefer another language (e.g., their own native language) over English.

Having illustrated and described the principles of the present invention in a preferred embodiment, it should be apparent to those skilled in the art that the embodiment can be modified in arrangement and detail without departing from such principles. Accordingly, we claim as our invention all such embodiments as come within the scope and spirit of the following claims and equivalents thereto.

We claim:

1. In a system having a first communications terminal coupled to a remote second communications terminal by a communications circuit, each communications terminal having a central processing unit coupled to a memory, the first communications terminal having one or more interactive voice response units, the second communications terminal having a display for visually outputting data signals, and an audio input/output device for inputting/outputting audio signals, a method of switching to use of visual data queries, comprising the steps of:

sending a first query from the first communications terminal to the remote second communications terminal, the first query comprising an audio signal allowing a user of the second communications terminal to receive subsequent queries as visual displays on the second communications terminal, or to proceed using audio queries alone;

outputting the first query on the second communications terminal using the audio input/output device;

monitoring the communications circuit from the first communications terminal to detect whether the user elects to employ visual display of queries; and, if so, outputting a subsequent set of queries in the form of a visual display on the second communications terminal, said visual display permitting the user to skip one or more intermediate levels of queries and thereby more quickly reach a desired result.

2. The method of claim 1 where sending a first query includes sending the first query using an interactive voice response unit.

3. The method of claim 1 where the monitoring step includes monitoring the communications circuit for both audio and data signals.

4. The method of claim 1 wherein the specific response is a telecommunications signal including DTMF tones.

5. The method of claim 1 where the outputting the subsequent set of queries step includes outputting query data using a hierarchical paradigm.

6. The method of claim 5 where the hierarchical paradigm is a decision tree.

7. The method of claim 5 which includes allowing a user of the second communications terminal to selectively respond to any of the outputted subset of interactive voice response queries at any level in the hierarchical paradigm, thereby skipping intermediate levels.

8. In a system having a first communications terminal coupled to a remote second communications terminal by a communications circuit, each communications terminal having a central processing unit coupled to a memory, the first communications terminal having one or more interactive voice response units, the second remote communications terminal having a display for visually outputting data signals, an audio input/output device for outputting audio signals, a method of choosing from a plurality of interactive voice response queries:

storing on the first communications terminal a set of interactive voice response queries;

sending a first subset of said plurality of interactive voice response queries to the second communications terminal;

outputting said subset of interactive voice response queries on the second communications terminal using a hierarchical paradigm;

allowing a user to selectively respond to any of the outputted subset of interactive voice response queries at any level in the hierarchical paradigm, thereby skipping intermediate levels;

monitoring the communications circuit to detect a response to the subset of interactive voice queries from the second communications terminal; and upon detecting a response, sending a subsequent subset of the plurality of interactive voice response queries to the second communications terminal for display, based on the user responses to said first subset of queries;

wherein the system determines which queries to present to a user based on a probabilistic scheme that directs the user to information most likely wanted or needed based on the system's experience with prior users.

9. The method of claim 7 where the sending steps include sending the subset of interactive voice response queries as data signals.

10. The method of claim 7 where the sending steps include sending the subset of interactive voice queries as audio and data signals.

11. The method of claim 7 where the hierarchical paradigm is a decision tree.

12. The method of claim 7 where the outputting step includes outputting the interactive voice queries as data on the display.

13. The method of claim 8 where the monitoring step includes monitoring the communications circuit for both audio and data signals.

14. In a system having a first communications terminal coupled to a remote second communications terminal by a communications circuit, each communications terminal having a central processing unit coupled to a memory, the first communications terminal having one or more interactive voice response units, the second remote communications terminal having a display for visually outputting data signals, an audio input/output device for outputting audio signals, a method of choosing from a plurality of interactive voice response queries:

storing in a database on the first communications terminal a set of interactive voice response queries;

sending a first subset of said plurality of interactive voice response queries to the second communications terminal;

outputting said subset of interactive voice response queries on the second communications terminal using a hierarchical paradigm;

allowing a user to selectively respond to any of the outputted subset of interactive voice response queries at any level in the hierarchical paradigm, thereby skipping intermediate levels;

monitoring the communications circuit to detect a response to the subset of interactive voice queries from the second communications terminal; and upon detecting a response, sending a subsequent subset of the plurality of interactive voice response queries to the second communications terminal for display, based on the user responses to said first subset of queries wherein the allowing step includes allowing a user using the second remote communications terminal to directly consult the database on the first communications terminal to obtain interactive voice response information not sent as default queries to the second communications terminal.

15. In a system having a first communications terminal coupled to a remote second communications terminal by a communications circuit, each communications terminal having a central processing unit coupled to a memory, the first communications terminal having one or more interactive voice response units, the second remote communications terminal having a display for visually outputting data signals, an audio input/output device for outputting audio signals, a method of choosing from a plurality of interactive voice response queries:

storing on the first communications terminal a set of interactive voice response queries;

sending a first subset of said plurality of interactive voice response queries to the second communications terminal;

outputting said subset of interactive voice response queries on the second communications terminal using a hierarchical paradigm;

allowing a user to selectively respond to any of the outputted subset of interactive voice response queries at any level in the hierarchical paradigm, thereby skipping intermediate levels;

monitoring the communications circuit to detect a response to the subset of interactive voice queries from the second communications terminal; and upon detecting a response, sending a subsequent subset of the plurality of interactive voice response queries to the second communications terminal for display, based on the user responses to said first subset of queries;

wherein the sending step includes sending the first subset and subsequent subsets of said current plurality of interactive voice response queries as hyper text markup language data, and the outputting step includes using a hyper text markup language viewer to output the subset of queries on the second communications terminal.

16. In a system having a first communications terminal coupled to a remote second communications terminal by a communications circuit, each communications terminal having a central processing unit coupled to a memory, the first remote communications terminal having one or more interactive voice response units, the second remote communications terminal having a display for visually outputting data signals, an audio input/output device, a method of completing automatic remote diagnosis of communications terminal problems comprising the steps of:

storing on the first communications terminal a set of interactive voice response queries;

sending a subset of said plurality of interactive voice response queries from the first communications terminal to the second communications terminal for display;

outputting the subset of interactive voice response queries on the second communications terminal using the display as a hierarchical paradigm;

allowing a user of the second communications terminal to selectively respond to any of the outputted subset of interactive voice response queries at any level in the hierarchical paradigm, thereby skipping intermediate levels;

monitoring the communications circuit to detect responses to the subset of interactive voice response queries from the second communications terminal;

launching a selected diagnostic application on the second communications terminal, the diagnostic application selected from a plurality of diagnostic applications based on the response obtained from the second communications terminal;

collecting diagnostic information from the second communications terminal using said diagnostic application;

sending said collected diagnostic information from the second communications terminal to the first communications terminal; and analyzing said collected diagnostic information from the second communications terminal on the first communications terminal.

17. The method of claim 16 where the launching step includes downloading a diagnostic application from the first communications terminal to the second communications terminal and executing said diagnostic application on the second communications terminal.

18. The method of claim 16 where the launching step includes executing resident a diagnostic application on the second communications terminal.

19. In a system having a first communications terminal coupled to a remote second communications terminal by a communications circuit, each communications terminal having a central processing unit coupled to a memory, the first communications terminal having one or more interactive voice response units, the second remote computer having a display for visually outputting data signals, a method of graphically displaying a plurality of interactive voice response queries comprising:

storing on the first communications terminal a set of interactive voice response queries;

sending a first subset of said plurality of queries to the second communications terminal as hyper text markup language data containing a pre-defined protocol;

outputting said first subset of queries of hyper text markup language data graphically on the second communications terminal;

allowing a user to selectively respond to any of the outputted subset of queries; and monitoring the communications circuit on the first communications terminal to detect a response from the from the second communications terminal.

20. The method of claim 19 further comprising:

upon detecting a response on the communications circuit on the first communications terminal, determining whether the response requests information stored on the first communications terminal using the pre-defined protocol, and if so, sending the requested information as hyper text markup language data containing the pre-defined protocol to the second communications terminal; and if not, the steps comprising:

determining from the response from the first communications terminal the address of a third remote communications terminal on which the information requested by the first communications terminal resides;

establishing a communications link to the third remote communications terminal;

sending the information request from the first communications terminal to the third communications terminal; and upon receiving a response from the third communications terminal on the first communications terminal, sending the information obtained from the third communications terminal as hyper text markup language data containing the pre-defined protocol to the second communications terminal.

21. The method of claim 19 further comprising:

allowing a user using the second communications terminal to selectively respond to any of the outputted subset of queries;

upon detecting a response, determining whether the response requests information stored on the second communications terminal using the pre-defined protocol, and if so, retrieving said information as hyper text markup language data from memory on the second communications terminal, and outputting said hyper text markup language data graphically on the second communications terminal.

22. The method of claim 19 wherein the hypertext markup language pre-defined protocol includes at least one reference to information on the first communications terminal, the second communications terminal, and at least one additional third communications terminal which is remote to both the first and second communications terminal.

23. The method of claim 19 wherein the hypertext markup language pre-defined protocol includes at least one reference to information on the first communications terminal.

24. The method of claim 19 wherein the hypertext markup language pre-defined protocol includes at least one reference to information on both the first and second communications terminal.

25. The method of claim 19 wherein the hypertext markup language data includes embedded audio and video data.

26. The method of claim 19 wherein the pre-defined protocol used in the hyper text markup language is a visual interactive voice response hypertext markup language protocol.

27. The method of claim 19 wherein the hypertext markup language data includes embedded graphical image data.

28. In a system having a first computer coupled to a remote second computer by a communications circuit, each computer having a central processing unit coupled to a memory, a display for visually outputting data signals, a speaker for outputting audio signals, the remote first computer having one or more interactive voice response units, the communication circuit allowing the transfer of both audio signals and data signals, a method of obtaining responses to a set of queries comprising the steps of:

sending a first set of queries from one or more of the interactive voice response units on the first computer to the second computer, the first set of queries comprising an audio signal allowing a user of the second computer to select display of subsequent queries on the second computer display;

outputting the first set of queries on the second computer using the speaker;

monitoring the communications circuit from the first computer to detect a specific response to the first set of queries from the second computer; and in response to the detection of said specific response, sending a subsequent set of queries comprising data signals to the second computer, and outputting the subsequent set of queries using the display on the second computer.

29. The method of claim 28 where sending a first set of queries includes sending the first set of queries using an interactive voice response unit.

30. The method of claim 28 where the monitoring step includes monitoring the communications circuit for both audio and data signals.

31. The method of claim 28 wherein the specific response is a telecommunications signal including DTMF tones.

32. The method of claim 28 where the outputting the subsequent set of queries step includes outputting query data from one or more of the interactive voice response units using a hierarchical paradigm.

33. The method of claim 32 where the hierarchical paradigm is a decision tree based on data collected from problems previously encountered by users.

34. The method of claim 28 further comprising:

updating the interactive voice response units with a set of queries relating to problems most recently encountered by users.

35. The method of claim 28 further comprising:

monitoring the communications circuit from the first computer to detect a second specific response to the subsequent set of queries outputted as data signals using the display on the second computer;

sending a third set of queries from one of the interactive voice response units as audio signals to the second computer; and outputting the third set of computers on the second computer using the speaker.

36. In a system having a first computer coupled to a remote second computer by a communications circuit, each computer having a central processing unit coupled to a memory, a display for visually outputting data signals, a speaker for outputting audio signals, the remote first computer having one or more interactive voice response units, the communications circuit allowing the transfer of both audio signals and data signals over said communications circuit, a method of displaying a plurality of queries:

maintaining a database on the first computer containing database entries listing a plurality of interactive voice response queries;

consulting the database on the first computer to obtain a current plurality of interactive voice response queries to display on the second computer, wherein the current plurality of interactive voice response queries is based on data collected from problems previously encountered by users;

sending a first subset of said current plurality of interactive voice response queries to the second computer, wherein the current subset of interactive voice response queries includes at least one problem encountered by more than one user;

outputting said subset of interactive voice response queries on the second computer;

allowing a user to selectively respond to any of the outputted subset of interactive voice response queries;

monitoring the communications circuit to detect a response to the subset of interactive voice queries from the second computer; and upon detecting a response, sending a subsequent subset of the plurality of interactive voice response queries to the second computer for display based on the user responses to said first subset of queries.

37. The method of claim 36 where the consulting step includes using data obtained from previous interactions by users who have had computer software problems.

38. The method of claim 36 where the sending steps include sending the subset of interactive voice response queries as data signals.

39. The method of claim 36 where the sending steps include sending the subset of interactive voice queries as audio and data signals.

40. The method of claim 36 where the outputting the subset of queries step includes outputting said interactive voice response queries using a hierarchical paradigm based on data collected from problems previously encountered by users.

41. The method of claim 40 where the hierarchical paradigm is a decision tree based on data collected from problems previously encountered by users.

42. The method of claim 36 where the outputting step includes outputting the interactive voice queries on the display from the one or more interactive voice response units.

43. The method of claim 36 where the allowing step includes allowing a user to jump directly to any subset of interactive voice response queries which are displayed, thereby skipping intermediate subsets.

44. The method of claim 36 where the monitoring step includes monitoring the communications circuit for both audio and data signals.

45. The method of claim 36 further comprising:

updating the interactive voice response units with a set of queries relating to problems most recently encountered by users.

46. The method of claim 36 wherein the step of maintaining a database on the first computer includes:

maintaining a hierarchical paradigm of database entries based on data collected from problems encountered by users; and updating the hierarchical paradigm of database entries as users encounter new or previously unknown problems.

47. The method of claim 36 wherein the step of consulting the database on the first computer to obtain a current plurality of interactive voice response queries includes using a probabilistic scheme which directs the user to solutions for problems that are most likely to be encountered for a particular set of software.

48. The method of claim 36 further comprising:

updating the interactive voice response units with a set of interactive voice response queries relating to problems most recently encountered by users.

49. In a system having a first computer coupled to a remote second computer by a communications circuit, each computer having a central processing unit coupled to a memory, a display for visually outputting data signals, a speaker for outputting audio signals, the remote first computer having one or more interactive voice response units, the communications circuit allowing the transfer of both audio signals and data signals over said communications circuit, a method of completing automatic remote diagnosis of computer problems comprising the steps of:

maintaining a database on the first computer containing database entries listing a plurality of interactive voice response queries, wherein the list of interactive voice response queries is based on data collected from problems previously encountered by users;

consulting the database on the first computer to obtain a current subset of the plurality of interactive voice response queries to display, wherein the current subset of interactive voice response queries includes at least one problem encountered by more than one user;

sending the subset of said plurality of interactive voice response queries from the first computer to the second computer for display;

outputting the subset of interactive voice response queries on the second computer using the display;

monitoring the communications circuit to detect response to the subset of interactive voice response queries from the second computer; and launching a selected diagnostic application on the second computer, the diagnostic application selected from a plurality of diagnostic application based on the response obtained to the subset of interactive voice response queries from the second computer.

50. The method of claim 49 further comprising:

updating the database on the first computer containing database entries listing a plurality of interactive voice response queries using the detected response to the subset of interactive voice queries from the second computer.

51. The method of claim 49 wherein the step of sending a subset of said plurality of interactive voice response queries from the first computer includes sending a set of queries relating to problems most recently encountered by users.

52. The method of claim 49 wherein the step of maintaining a database on the first computer includes:

maintaining a hierarchical paradigm of database entries based on data collected from problems encountered by users; and updating the hierarchical paradigm of database entries as users encounter new or previously unknown problems.

53. The method of claim 49 wherein the step of consulting the database on the first computer includes using a probabilistic scheme to obtain a current subset of the plurality of interactive voice response queries which directs the user to solutions for problems that are most likely to be encountered for a particular set of software.

54. The method of claim 49 further comprising:

updating the interactive voice response units with a set of interactive voice response queries relating to problems most recently encountered by users.

55. The method of claim 49 further comprising:

outputting the subset of interactive voice response queries in a hierarchical paradigm containing a plurality of levels, wherein upper levels in the hierarchical paradigm represent a description of problems that are most likely to be encountered for a particular set of software problems; and launching automatically a selected diagnostic program on the second computer whenever selected levels in the hierarchical paradigm are accessed based on the detected response.

56. A computer readable medium having stored therein instructions for causing a first computer to execute the following method:

sending a first set of queries from one or more interactive voice response units on the first computer to a second computer, the first set of queries comprising an audio signal allowing a user of the second computer to select display of subsequent queries on the second computer;

monitoring a communications circuit linking the second and first computers to detect a specific response to the first set of queries from the second computer; and in response to detection of said specific response, sending a subsequent set of queries comprising data signals to the second computer for display thereon.

57. A computer readable medium having stored therein instructions for causing a first computer to execute the following method:

maintaining a database containing database entries listing a plurality of interactive voice response queries;

consulting the database to obtain a current plurality of interactive voice response queries to display on a second computer, wherein the current plurality of interactive voice response queries is based on data collected from problems previously encountered by users;

sending a first subset of said current plurality of interactive voice response queries to the second computer, wherein the current subset of interactive voice response queries includes at least one problem encountered by more than one user;

monitoring a communications circuit linking the second and first computers to detect a user response to the subset of interactive voice queries from the second computer; and upon detecting a response, sending a subsequent subset of the plurality of interactive voice response queries to the second computer for display based on said user response to said first subset of queries.

58. A computer readable medium having stored therein instructions for causing a first computer to execute the following method:

maintaining a database containing database entries listing a plurality of interactive voice response queries, wherein the list of interactive voice response queries is based on data collected from problems previously encountered by users;

consulting the database to obtain a current subset of the plurality of interactive voice response queries to display, wherein the current subset of interactive voice response queries includes at least one problem encountered by more than one user;

sending the subset of said plurality of interactive voice response queries from the first computer to a second computer for display;

monitoring a communications circuit linking the second and first computers to detect a response to the subset of interactive voice response queries from the second computer; and launching a selected diagnostic application on the second computer, the diagnostic application selected from a plurality of diagnostic applications based on the response obtained to the subset of interactive voice response queries from the second computer.

* * * * *

UNITED STATES PATENT AND TRADEMARK OFFICE
CERTIFICATE OF CORRECTION

PATENT NO.    : 5,802,526
DATED         : September 1, 1998
INVENTOR(S)   : Fawcett et al.

It is certified that error appears in the above-identified patent and that said Letters Patent is hereby corrected as shown below:

Column 1,
Line 57, "co nnected" should read -- connected --.

Column 3,
Line 2, "etc.) As" should read -- etc.). As --.
Lines 14 and 23, "IVR" should read -- IVRU --.

Column 4,
Line 17, "with caller" should read -- with a caller --.
Line 44, "within the of the" should read -- within the --.
Line 51, "level" should read -- levels --.

Column 6,
Line 20, "connections," should read -- connections --.
Line 22, "network connections," should read -- network connections --.

Column 8,
Line 57, "IVR" should read -- IVRU --.

Column 9,
Line 48, ""1":" should read -- "1:" --.

Column 13,
Line 56, "to a remote computers" should read -- to remote computers --.

Column 14,
Line 66, "(110-166)" should read -- (110-116) --.

Column 16,
Lines 47, 50, 53 and 55, "The method of claim 7" should read -- The method of claim 8 --.

UNITED STATES PATENT AND TRADEMARK OFFICE
CERTIFICATE OF CORRECTION

PATENT NO.   : 5,802,526
DATED        : September 1, 1998
INVENTOR(S)  : Fawcett et al.

It is certified that error appears in the above-identified patent and that said Letters Patent is hereby corrected as shown below:

<u>Column 18,</u>
Line 43, "resident a diagnostic" should read -- a resident diagnostic --.
Line 66, "from the from the" should read -- from the --.

<u>Column 20,</u>
Line 48, "outputting the third set of computers" should read -- outputting the third set of queries --.

Signed and Sealed this

Twenty-fifth Day of June, 2002

Attest:

JAMES E. ROGAN
*Attesting Officer*   *Director of the United States Patent and Trademark Office*